March 22, 1949. C. H. ROCKWOOD 2,464,943
THERMALLY RESPONSIVE ACTUATOR
Filed May 31, 1945
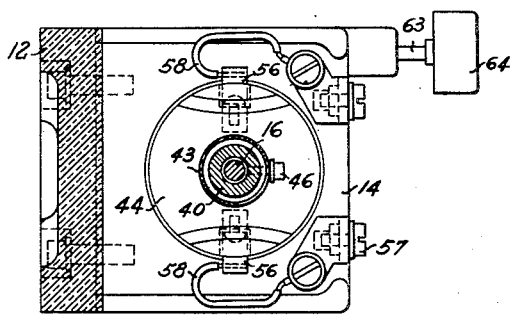
Fig. 3
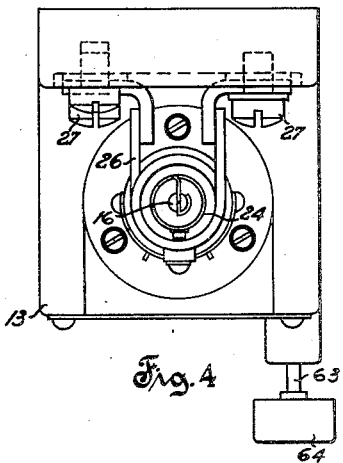
Fig. 4
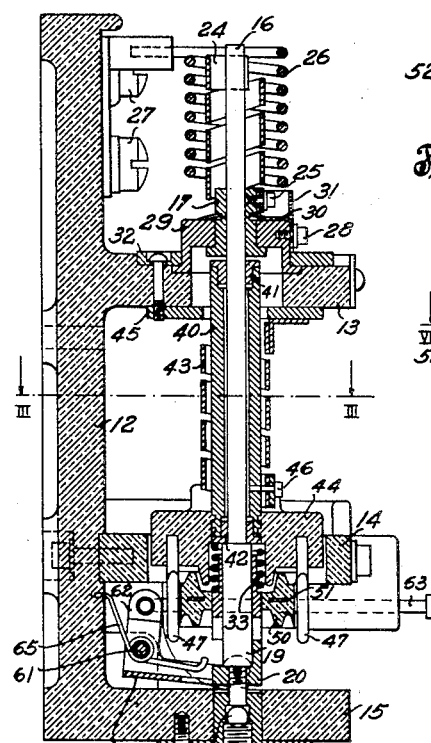
Fig. 2
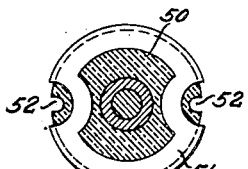
Fig. 6
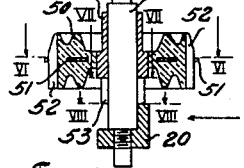
Fig. 5
Fig. 7
Fig. 8
Fig. 9
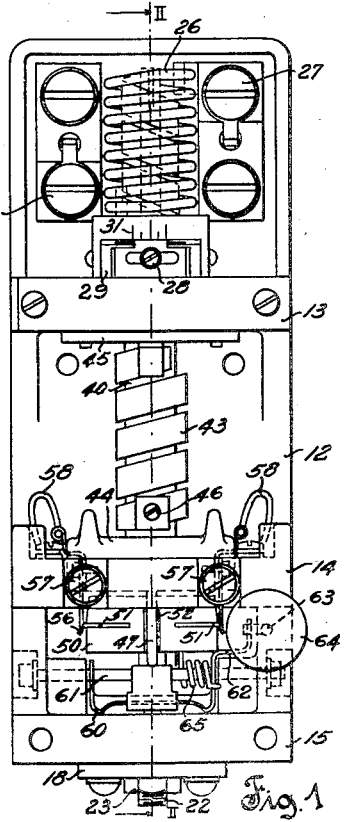
Fig. 1
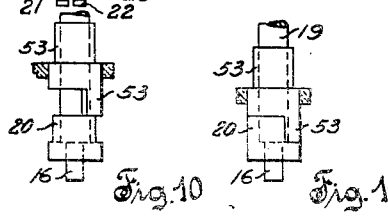
Fig. 10   Fig. 11
Inventor
Charles H. Rockwood
by Harold A. Silver
Attorney Patented Mar. 22, 1949

2,464,943

UNITED STATES PATENT OFFICE 2,464,943

THERMALLY RESPONSIVE ACTUATOR

Charles H. Rockwood, West Allis, Wis., assignor to Allis-Chalmers Manufacturing Company, Milwaukee, Wis., a corporation of Delaware Application May 31, 1945, Serial No. 596,895

19 Claims. (Cl. 200—116)

This invention relates in general to a thermally responsive actuator such as may be utilized in a relay, valve, and the like, and relates more particularly to a thermally responsive actuator that is compensated for changes in ambient temperature.

In thermally actuated devices such as relays, valves and the like it is often desirable to translate the inherently slow movement of a thermally responsive member to a rapid movement of the contact, valve or other device operated. Prior art thermally actuated relays have been provided with two thermally actuable members, one of which is responsive to desired thermal changes and the other of which is responsive to the ambient temperature. Correlation of these two thermal devices provides response to the desired thermal changes independently of the ambient temperature.

In the prior art compensated thermal relays, both thermally actuable members have been operable on the same operating member, usually a latch tripping mechanism. The thermally actuable member responsive to ambient temperature either restrains or aids the thermally actuable member responsive to the desired temperature condition. Thus when such prior art latch tripping mechanisms have been close to the point of tripping the latch, a mechanical shock imparted to the thermally actuated device would cause actuation of the operating member to operate the relay although the thermal condition to which the device is responsive did not call for an operation of the device.

It is therefore an object of the present invention to provide a thermally responsive actuator provided with compensation for ambient temperature but avoiding the above referred to disadvantages of prior art devices.

It is also an object of the present invention to provide a thermally responsive actuator having separate thermally actuable members responsive to desired predetermined temperature conditions and to ambient temperature conditions, respectively, which actuator will not be actuated due to mechanical shock unless the desired predetermined temperature conditions prevail.

It is also an object of the present invention to provide an improved compensated temperature relay in which opening movement of the contact is snap-acting but which will withstand high mechanical shock without tripping.

It is a further object of the present invention to provide a thermally responsive relay, that is compensated for ambient temperature conditions, with a latch tripping and contact operating mechanism having members that are relatively rotatable in response to thermal conditions and which have rapid axial contact operating movement only when such members have a predetermined relative angular relation.

Objects and advantages other than those above set forth will be apparent from the following description when read in connection with the accompanying drawing, in which:

Fig. 1 is a front elevational view of a thermal relay embodying the present invention;

Fig. 2 is a vertical section view taken along the line II—II of Fig. 1;

Fig. 3 is a section view taken along the line III—III of Fig. 2;

Fig. 4 is a plan view of the device shown in Fig. 1;

Fig. 5 is a partial section view of the vertically movable element of the relay shown in Figs. 1 to 4;

Fig. 6 is a horizontal section view taken along the line VI—VI of Fig. 5;

Fig. 7 is a section view taken along the line VII—VII of Fig. 5;

Fig. 8 is a section view taken along the line VIII—VIII of Fig. 5;

Fig. 9 is a view similar to that of Fig. 7 but with the parts in a different position;

Fig. 10 is a side view of a part of the device of Fig. 5, looking in the direction of the arrow; and Fig. 11 is a view similar to that of Fig. 10 but with the parts in a different position.

In the drawing, the single embodiment of the invention is illustrated in a thermal relay. The relay has a base 12 made of suitable insulating material, which base 12 has an upper extension 13, a lower extension 15 and a middle extension 14. A vertical shaft 16 extends substantially from top to bottom of the relay and has an upper bearing in a bushing 17 in the extension 13, and a lower bearing in a bushing 18 in the extension 15. The end of the shaft 16 rests on a ball bearing 21 supported in the bushing 18 by means of an adjusting screw 22 held by a lock nut 23.

A thermal actuator for actuating the shaft 16 in accordance with desired thermal condition is shown as a bimetallic member 24. One end of the bimetallic member 24 fits into a slot in the upper end of the shaft 16 and the lower end of the bimetallic member 24 is fastened to the bushing 17 by means of a screw 25. The bushing 17 is adjustably held in a supporting member 29 by means of a mechanical link 30 and an adjusting screw 28. A supporting member 29 is rigidly held in the extension 13 by means of a plate 32 securely fastened to the extension 13. A scale 31 is provided to show the adjustment of the bimetal 24.

A second thermally actuable shaft 40 surrounds the inner shaft 16 and is rotatable independently of rotation of the shaft 16. Shaft 40 has a bushing 41 at the top thereof providing a bearing. A bushing 42 at the bottom of the shaft 40 provides additional bearing. The bushing 42 rests against a shoulder formed by an enlarged portion 19 on the shaft 16. A bimetal member 43 is rigidly fastened to a plate 45 rigidly fastened to the extension 13. The lower end of the bimetal 43 is fastened to the outer shaft 40 by means of a screw 46. An insulating member 44 provided with two depending guiding members 47, is rigidly fastened to the outer shaft 40 for rotation therewith.

A latch member 20 is pinned to the shaft 16 at the lower end thereof for rotation therewith. A contact operating member 50 is supported on the enlargement 19 of the shaft 16 as shown more clearly in Fig. 5. The operating member 50 is free to rotate independently of rotation of the shaft 16. The operating member 50 has a movable contact 51 molded therein as shown more clearly in Fig. 6. Guiding slots 52 in the contact operator 50 cooperate with the depending guide 47 on the member 44 so that the contact operator 50 rotates with the outer shaft 40 but is free for independent axial movement relative to the shaft 40.

Fixed contacts 56 are arranged to be bridged by the movable contact 51 and are connected to contact terminals 57 by means of connections 58. The terminals 57 may be connected to any circuit that is to be controlled by the thermal relay.

The latching member 20, as shown more clearly in Figs. 5, 8, 10 and 11 is provided with a cutaway portion extending about 225 degrees of its periphery. The extending portion of the latching member 20, therefore, extends about 135 degrees of its periphery. A similar latching member 53 has extending and cut-away portions reversed relative to the member 20, that is, the extending portion is below the cut-away portion and the extending portion of latching member 53 cooperates with the extending portion of latching member 20 as shown in detail in Figs. 5, 7, 8, 10 and 11.

The contact operator 50 is biased downwardly by a spring 33 between the movable contact operator 50 and the bushing 42. Thus, when the latching members 53 and 20 are in a predetermined relative angular position such as shown in Fig. 10, the movable contact operator 50 will be held in the position shown in Fig. 2 where the contact 51 bridges the fixed contacts 56. Such position of the latching members 20 and 53, when the contacts 51 and 56 are closed, is shown in more detail in Fig. 10. Upon relative angular movement between the contact operator 50 and the inner shaft 16, relative movement between the latch members 53 and 20 will take place and when such movement is sufficient, these latch members will take the position shown in Fig. 11, by permitting the spring 33 to move the contact operator 50 rapidly in a downward direction axially of the shaft. This effects a snap action opening of contacts 51 and 56 and prevents the cooling of bimetal 24 from angularly moving member 50. Consequently, the subsequent cooling of bimetal element 24 conditions this element to effect an angular movement (rotation) of member 50 relative to shaft 16 and fixed contacts 56 just as soon as member 50 is moved axially relative to shaft 16 a sufficient distance for latch parts 20 and 53 to assume the relative positions best shown in Figs. 2, 5 and 10.

A resetting member 60 is rotatable on a shaft 61 by means of a crank 62 actuated by a pin 63 extending out through the extension 14 and provided at its outer end with a push button 64. A spring 65 biases the resetting member 60 to the position shown in Figs. 1 and 2. Movement of the push button to the left as viewed in the drawing operates the crank 62 in a counter-clockwise direction about the shaft 61 thereby raising the extending ends of the operator 60 to lift the movable contact operator 50 upward, where, if permitted by action of the bimetals, the circuit between contacts 51 and 56 will again be closed and held closed by the latch members 53 and 20 assuming the position shown in Fig. 10. In this connection it should be noted that with bimetal elements 24 and 43 conditioned to permit contact 51 to be reset and retained in bridging engagement with fixed contacts 56, a resetting actuation of operator 60 results in an axial movement of contact 51 into firm bridging engagement with contacts 56 and that this axial movement of contact 51 is immediately followed by a bimetal actuated angular movement (rotation) of contact 51 relative to contacts 56, thereby insuring a good electrical contact by affording a positive wiping action.

The bimetal 24 is shown as being surrounded by a heater coil 26 which may be connected in any desired circuit to which the relay is to be responsive. An increase in the temperature of the heater coil 26 tends to rotate the shaft 16 in a clockwise direction as viewed in Fig. 3. The bimetal 43 is responsive to the ambient temperature and an increase in the ambient temperature tends to move the shaft 40 in a clockwise direction as viewed in Fig. 3.

Thus if the temperature of the heater coil 26 and the temperature of the ambient should change at the same rate and in the same direction, the latching members 53 and 20 would move together and no operation of the contacts 51 and 56 would be effected. However, rotation of the shaft 16 due to a temperature change in the heating coil 26 relative to a temperature change of the bimetal 43 will move the inner shaft 16 in a clockwise direction as viewed in Fig. 3 until the latching member 20 and the latching member 53 take the relative position shown in Fig. 11. And it should also be noted that a releasing movement of latching members 20 and 53 is always accompanied by a relative angular movement of contacts 51 and 56, thereby affording a positive wiping action which tends to keep these contacts conditioned for establishing a good electrical contact.

Because of the rotational movement necessary to trip the latching members 20 and 53, such members can be very close to the point of tripping but will still withstand high mechanical shock without tripping the relay. This improved operation is obtained without loss of the desired snap action in the opening movement of the contacts 51 and 56.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In combination, a first rotatable member, a first thermally actuable member arranged for rotating said first member, a second rotatable member supported adjacent said first rotatable member, a second thermally actuable member arranged for rotating said second rotatable member independently of rotation of said first rotatable member, an operating member supported for rotational movement in accordance with rotational movement of one of said rotatable members, said operating member being also supported for axial movement relative to said rotatable members and independent of the movement thereof, and means operative to effect a snap action axial movement of said operating member relative to said rotatable members when the latter attain a relative predetermined angular relationship.

2. In combination, a first rotatable member, a first bimetallic member arranged for rotating said first member, a second rotatable member supported coaxially with said first rotatable member, a second bimetallic member arranged for rotating said second rotatable member independently of rotation of said first rotatable member, an operating member supported for rotational movement in accordance with rotational movement of one of said rotatable members, said operating member being also supported for axial movement relative to said rotatable members and independent of the movement thereof, and means operative to effect a rapid axial movement of said operating member relative to said rotatable members when the latter attain a relative predetermined angular relationship.

3. In combination in an electric circuit breaker, a first rotatable member, a first thermally actuable member arranged for rotating said first member, a second rotatable member supported adjacent said first rotatable member, a second thermally actuable member arranged for rotating said second rotatable member independently of rotation of said first rotatable member, a fixed contact, a contact carrying member supported for rotational movement in accordance with rotational movement of one of said rotatable members with its contact disposed in firm wiping engagement with said fixed contact, said contact carrying member being also supported for axial movement independent of movement of said rotatable members sufficient to open and close said contacts, and means operative to effect a snap action axial movement of said contact carrying member when said rotatable members attain a relative predetermined angular relationship.

4. In combination in an electric circuit breaker, a first rotatable member, a first bimetallic member arranged for rotating said first member, a second rotatable member supported coaxially with said first rotatable member, a second bimetallic member arranged for rotating said second rotatable member independently of rotation of said first rotatable member, a fixed contact, a contact carrying member supported for rotational movement in accordance with rotational movement of one of said rotatable members with its contact disposed in firm wiping engagement with said fixed contact, said contact carrying member being also supported for axial movement independent of movement of said rotatable members sufficient to open and close said contacts, and means operative to effect a rapid axial movement of said contact carrying member when said rotatable members attain a relative predetermined angular relationship.

5. In combination in an electric circuit breaker, a first rotatable member, a first bimetallic member arranged for rotating said first member, a second rotatable member supported coaxially with said first rotatable member, a second bimetallic member arranged for rotating said second rotatable member independently of rotation of said first rotatable member, a fixed contact, a contact carrying member supported for rotational movement in accordance with rotational movement of one of said rotatable members with its contact disposed in firm wiping engagement with said fixed contact, said contact carrying member being also supported for axial movement independent of movement of said rotatable members sufficient to open and close said contacts, means providing rapid axial movement of said contact carrying member to open said contacts when said rotatable members attain a relative predetermined angular relationship, and manually operable means for effecting an axial movement of said contact carrying members sufficient to close said contacts and to permit said one rotatable member and the associated bimetallic member to angularly move said contact carrying member relative to said fixed contact.

6. In a thermally responsive actuator, a first shaft rotatable in response to changes in thermal conditions that are a measure of current in an electric circuit, a second shaft rotatable in response to changes in ambient temperature, a latching member rotatable by said first shaft, a rotatably mounted operator connected with said second shaft for rotation therewith, said operator being movable longitudinally relative to both shafts and including a latch part coacting with said latching member to maintain said operator in a predetermined position, and means released in response to a relative angular movement of said shafts effected by a predetermined temperature difference between said thermal conditions and said ambient temperature for effecting a snap action longitudinal movement of said operator and latching part relative to said latching member.

7. In a thermally responsive actuator, a first shaft rotatable in response to thermal changes varying as a function of a condition to be controlled, a second shaft rotatable independently of said first shaft in response to changes in ambient temperature, a latch member secured to said first shaft for rotation therewith, an operator supported for movement both angularly and longitudinally relative to said first shaft and being connected with said second shaft for rotation therewith and for independent movement longitudinally thereof, said latch member and operator including coacting parts operative to normally retain said operator in a predetermined position, and means operative in response to a predetermined relative angular rotation of said shafts for effecting a rapid longitudinal movement of said operator.

8. In a thermally responsive actuator, a first shaft rotatable in response to thermal changes varying as a function of a condition to be controlled, a second shaft mounted in coaxial relation with respect to said first shaft and being rotatable independently thereof in response to changes in ambient temperature, a latch member secured to said first shaft for rotation therewith, an operator slidably journaled on said first shaft and being connected with said second shaft for rotation therewith and for independent movement longitudinally thereof, said latch member and operator including coacting parts operative to normally retain said operator in a predetermined position, and means operative in response to a predetermined relative angular rotation of said shafts for effecting a rapid longitudinal movement of said operator.

9. In a thermally responsive actuator, a first shaft rotatable in response to thermal changes varying as a function of a condition to be controlled, a second shaft mounted in coaxial relation with respect to said first shaft and being rotatable independently thereof in response to changes in ambient temperature, an annular latch member surrounding said first shaft and secured thereto for rotation therewith, said latch member presenting longitudinally spaced circumferentially extending shoulder portions, an annular operator slidably journaled on said first shaft and being connected with said second shaft for rotation therewith and for independent movement longitudinally thereof, said operator including a latch part opposing said latch member and presenting longitudinally spaced circumferentially extending shoulder portions similar to and coactable with the shoulder portions of said latch member to retain said operator in either one of two positions, and means operative in response to a predetermined relative rotation of said shafts for effecting a rapid longitudinal movement of said operator from one to the other of said two positions.

10. In a thermally responsive actuator, a first shaft rotatable in response to thermal changes varying as a function of a condition to be controlled, a second shaft mounted in coaxial relation with respect to said first shaft and being rotatable independently thereof in response to changes in ambient temperature, an annular latch member surrounding said first shaft and secured thereto for rotation therewith, said latch member presenting longitudinally spaced circumferentially extending shoulder portions, an annular operator slidably journaled on said first shaft and being connected with said second shaft for rotation therewith and for independent movement longitudinally thereof, said operator including a latch part opposing said latch member and presenting longitudinally spaced circumferentially extending shoulder portions similar to those presented by said latch member, and a spring means urging said operator toward said latch member.

11. In a thermally responsive actuator including a pair of coaxial shafts mounted for relative rotation in response to changes in a thermal condition to be controlled, a sleeve-like latch member secured to one of said shafts for rotation therewith and presenting a pair of longitudinally spaced circumferentially extending shoulder portions, an annular operator slidably journaled on said one shaft and being connected with the other one of said shafts for rotation therewith and for independent movement longitudinally thereof, said operator including a latch part opposing said latch member and presenting a pair of longitudinally spaced circumferentially extending shoulder portions coactable with the shoulder portions of said latch member to retain said operator in either one of two positions, and means operative in response to a predetermined relative rotation of said shafts for effecting a rapid longitudinal movement of said operator from one to the other of said two positions.

12. In a thermally responsive actuator including a pair of shafts mounted for relative rotation in response to changes in a thermal condition to be controlled, a sleeve-like latch member mounted for rotation in accordance with the rotational movement of one of said shafts and presenting a pair of longitudinally spaced circumferentially extending shoulder portions, an annular operator slidably journaled in opposed coaxial relation with respect to said latch member and being connected with the other one of said shafts for rotation in accordance with the rotational movement of said other shaft and for independent longitudinal movement toward or away from said latch member, said operator including a sleeve-like latch part presenting a pair of longitudinally spaced circumferentially extending shoulder portions coactable with the shoulder portions of said latch member to retain said operator in either one of two positions, and means operative in response to a predetermined relative rotation of said shafts for effecting a rapid longitudinal movement of said operator from one to the other of said two positions.

13. In a thermally responsive actuator including a pair of shafts mounted for relative rotation in response to changes in a thermal condition to be controlled, a latch member mounted for rotation in accordance with the rotational movement of one of said shafts and presenting a pair of longitudinally spaced shoulder portions, an operator slidably journaled in opposed relation with respect to said latch member and being connected with the other one of said shafts for rotation in accordance with the rotational movement of said other shaft and for independent longitudinal movement toward or away from said latch member, said operator presenting a pair of longitudinally spaced shoulder portions coactable with the shoulder portions of said latch member to retain said operator in either one of two positions, and means operative in response to a predetermined relative rotation of said shafts for effecting a rapid longitudinal movement of said operator from one to the other of said two positions.

14. In a thermally responsive actuator including a pair of shafts mounted for relative rotation in response to changes in a thermal condition to be controlled, a latch member mounted for rotation in accordance with the rotational movement of one of said shafts, an operator slidably journaled in opposed relation with respect to said latch member and being connected with the other one of said shafts for rotation in accordance with the rotational movement of said other shaft and for independent longitudinal movement toward or away from said latch member, said latch member and operator having parts coactable to retain said operator in either one of two positions, and means operative in response to a predetermined relative rotation of said shafts for effecting a rapid longitudinal movement of said operator from one to the other of said two positions.

15. In a thermally responsive actuator including a pair of shafts mounted for relative rotation in response to changes in a thermal condition to be controlled, a latch member mounted for rotation in accordance with the rotational movement of one of said shafts, an operator slidably journaled adjacent said latch member and being connected with the other one of said shafts for rotation in accordance with the rotational movement of said other shaft and for independent longitudinal movement toward or away from said latch member, and means continuously acting to urge said operator toward said latch member, said latch member and operator having coacting parts operative to retain said operator in one of two predetermined positions during a predetermined relative rotation of said shafts and operative upon a further relative rotation of said shafts to render said means effective to rapidly move said operator toward said latch member.

16. In a thermally responsive actuator including a pair of shafts mounted for relative rotation in response to changes in a thermal condition to be controlled, a latch member mounted for rotation in accordance with the rotational movement of one of said shafts, an operator slidably journaled adjacent said latch member and being connected with the other one of said shafts for rotation in accordance with the rotational movement of said other shaft and for independent longitudinal movement relative to said other shaft and relative to said latch member, and means continuously acting to move said operator longitudinally relative to said latch member, said latch member and operator having coacting parts operative to retain said operator in one of two predetermined positions during a predetermined relative rotation of said shafts and operative upon a further relative rotation of said shafts to render said means effective to rapidly move said operator longitudinally relative to said latch member.

17. In a thermally responsive relay including a pair of shafts, means responsive to changes in a thermal condition to be controlled for relatively rotating said shafts, a latch member mounted for rotation in accordance with the rotational movement of one of said shafts, an operator slidably journaled adjacent said latch member and being connected with the other one of said shafts for rotation in accordance with the rotational movement of said other shaft and for independent longitudinal movement relative to said other shaft and relative to said latch member, means continuously acting to move said operator longitudinally relative to said other shaft and relative to said latch member, said latch member and operator having coacting parts operative to retain said operator in a predetermined position during a predetermined relative rotation of said shafts, a first fixedly supported contact, and a second contact carried by said operator and disposed in firm wiping engagement with said first contact when said operator is in said predetermined position and during said predetermined relative rotation of said shafts, said coacting parts being also operative upon a further relative rotation of said shafts to render said means effective to rapidly move said operator and second contact longitudinally relative to said other shaft and away from said first contact.

18. In a thermally responsive relay including a pair of shafts, means responsive to changes in a thermal condition to be controlled for relatively rotating said shafts, a latch member mounted for rotation in accordance with the rotational movement of one of said shafts, an operator slidably journaled adjacent said latch member and being connected with the other one of said shafts for rotation in accordance with the rotational movement of said other shaft and for independent longitudinal movement relative to said other shaft and relative to said latch member, said latch member and operator having coacting parts operative to retain said operator in a predetermined position during a predetermined relative rotation of said shafts, a first fixedly supported contact, and a second contact carried by said operator and disposed in firm wiping engagement with said first contact when said operator is in said predetermined position and during said predetermined relative rotation of said shafts, and means operative in response to a further relative rotation of said shafts for effecting a rapid movement of said operator and second contact longitudinally relative to said other shaft and away from said first contact.

19. In a thermally responsive relay, a first shaft, means responsive to changes in thermal conditions that are a measure of current in an electrical circuit for rotating said first shaft, a second shaft, means responsive to changes in ambient temperature for rotating said second shaft, a first latching member rotatable by said first shaft, a second latching member rotatable by said second shaft, means operative to effect a relative and rapid movement of said latching members in response to a predetermined relative angular movement of said shafts, a first fixedly supported contact, a second contact mounted for movement longitudinally of the axis of one of said shafts into and out of engagement with said first contact, said second contact being also mounted for movement angularly of said axis while engaged with said first contact, and means connecting said second contact to one of said latching members to cause said second contact to move both angularly and axially in accordance with the like movements of said one of said latching members.

CHARLES H. ROCKWOOD.

REFERENCES CITED

The following references are of record in the file of this patent:

UNITED STATES PATENTS

| Number | Name | Date |
|---|---|---|
| 1,942,699 | Henning | Jan. 9, 1934 |
| 2,026,373 | Bush | Dec. 31, 1935 |
| 2,300,901 | Armstrong | Nov. 3, 1942 |
| 2,305,446 | Saul | Dec. 15, 1942 |
| 2,326,529 | Frese | Aug. 10, 1943 |

FOREIGN PATENTS

| Number | Country | Date |
|---|---|---|
| 540,237 | Great Britain | Oct. 9, 1941 |
| 155,642 | Germany | Oct. 31, 1904 |